United States Patent Office 3,364,862
Patented Jan. 23, 1968

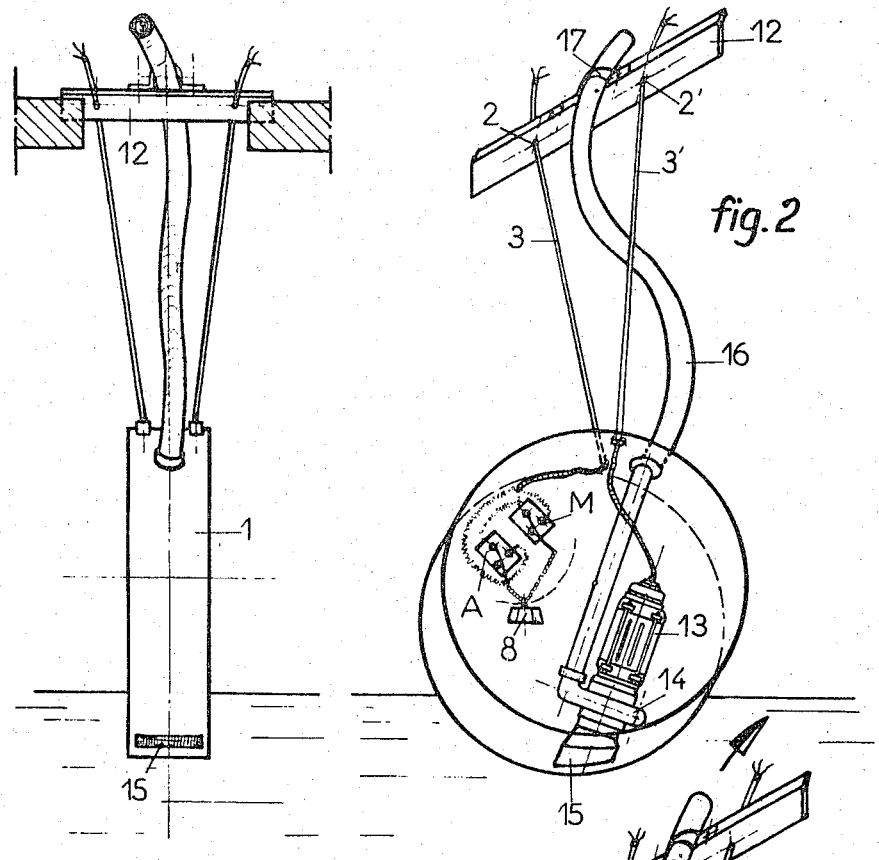

3,364,862
ACTUATING MEANS FOR FLOATING
MOTOR PUMP
François C. L. Duveau, 74 Rue Michel-Ange,
Paris, 16eme, France
Filed Aug. 12, 1965, Ser. No. 479,064
Claims priority, application France, Aug. 25, 1964,
986,108
3 Claims. (Cl. 103—26)

ABSTRACT OF THE DISCLOSURE

An electrical switch including a ballast mass and switch contacts mounted in a floating enclosure. The ballast mass including a mass connected to movable contacts of the switch and another ballast mass determining the center of gravity of the enclosure so that as the enclosure rotates about its center of gravity the switch contacts will close.

The invention relates to a floating switch for regulating the level of a liquid between two predetermined heights, comprising a single swingable enclosure in which are located a ballast mass and two switches controlling the motor of a motor pump, the movable contacts of said switches being joined together by a flexible connection of a non-conducting substance on which during the swing, there slides a mass by the force of gravity, whereby said switches are controlled.

The swingable enclosure is ballasted to locate the center of gravity of the enclosure and its equipment at a certain distance from the point which is the center of thrust when the enclosure is floating.

The applicant has now discovered an improvement taking advantage from the presence of a ballast mass and replacing it wholly or in part by the mass of a motor-pump group, the switches of which, mounted and connected as above mentioned, are contained in the enclosures and control the functioning of the motor of the group.

The invention will now be described with reference to the accompanying drawings, which show an embodiment of the invention but in no restrictive sense.

FIG. 1 is a side view showing the device in the suspended position with the liquid at the minimum level;

FIG. 2 is a partial perspective view of the device taken in a direction perpendicular to the view of FIG. 1, the device still being in a suspended position; and FIG. 3 is a partial perspective side view of the device positioned so that the pump is in operation.

In both FIGURES 2 and 3 the enclosure is supposed to be transparent in order to be able to see the interior arrangement.

Accordingly the number 1 represents the enclosure having the shape of cylindrical drum. Said enclosure is suspended at two fixed points 2 and 2′ by flexible electrical sheaths 3 and 3′ through which pass the electric conductors joining respectively the assembly of switches A and M and the motor of the pump to a control board not represented.

The part of a frame where the two fixing points 2 and 2′ are located is represented by an angle-iron.

A sliding mass 8 is shown attached to the movable contact members of the switches A and M. The operation of this sliding mass and switch arrangement is well known and has been described in French Patent 1,364,082.

According to the invention, the conventional ballast mass has been replaced by an electrically controlled motor pump, the motor being designated by 13 and the pump by 14, whereas 15 is the strainer and 16 the output pipe of the pump, said conduit being comparatively long so as hardly to make its presence felt in the movement of the apparatus. It abuts at 17 on the angle iron 12.

The usual water tight devices are provided at the points where the sheaths and the output pipe pass through the wall of the enclosure.

As previously stated, FIG. 2 shows the device when the water level is at the minimum position. The mass of the motor pump unit will cause the enclosure 1 to roll about the ends of the sheaths 3 and 3′ as the bouyancy of the rising water tends to give greater and greater lift to the cylindrical drum. At a predetermined point, the cylindrical drum will have rolled sufficiently that the mass 8 will swing, by gravitational force, to the position shown in FIG. 3. This position will cause the actuation of switches A and M to energize the pump to commence pumping the liquid from the container to thereby prevent it from rising above the predetermined desirable level.

What I claim is:

1. An improvement in floating switches for regulating the level of a liquid between two predetermined heights, comprising a suspended enclosure in which are located a ballast mass and two switches controlling the motor of a motor pump, the movable contacts of said switches being joined together by a flexible connection of non-conductive material on which connection during the swing a mass slides by gravity, whereby said switches are controlled, characterized in that said ballast mass in the said suspended enclosure includes the motor-pump controlled by the said switches.

2. An improvement in floating switches for regulating the level of liquid in a container between a maximum and a minimum predetermined height comprising an enclosure suspended within said container, said enclosure containing therein a ballast mass, a motor-pump unit forming a major part of said ballast mass, a pair of switches for selectively energizing and deenergizing said motor pump unit, a minor ballast mass attached to the movable contact members of said switches wherein as the liquid level rises, said container will rotate about its center of gravity according to the disposition of said major ballast mass so that said minor ballast mass will be moved by gravity to displace said movable contacts to thereby energize the motor pump combination to thus lower the fluid level.

3. An improvement in floating switches for regulating the level of a liquid in a container between predetermined maximum and minimum heights comprising a sealed enclosure suspended within said container, said enclosure containing a motor-pump combination, a pair of switches having movable contact members, a ballast mass flexibly attached to said movable contact members by a non-conductive material, said motor-pump mass causing said enclosure to rotate about its center of gravity as the liquid level rises thereby displacing said ballast mass by gravity to cause said movable contacts to make with the stationary contacts whereby said motor-pump combination will be energized and commence pumping liquid from said container.

References Cited

UNITED STATES PATENTS

| 1,938,719 | 12/1933 | Quimby | 103—87 |
| 3,090,849 | 5/1963 | Coulin | 103—26 |

FOREIGN PATENTS

| 853,368 | 12/1939 | France. |
| 952,812 | 5/1949 | France. |

DONLEY J. STOCKING, Primary Examiner.

WILLIAM L. FREEH, Examiner.